2,778,209
Patented Jan. 22, 1957

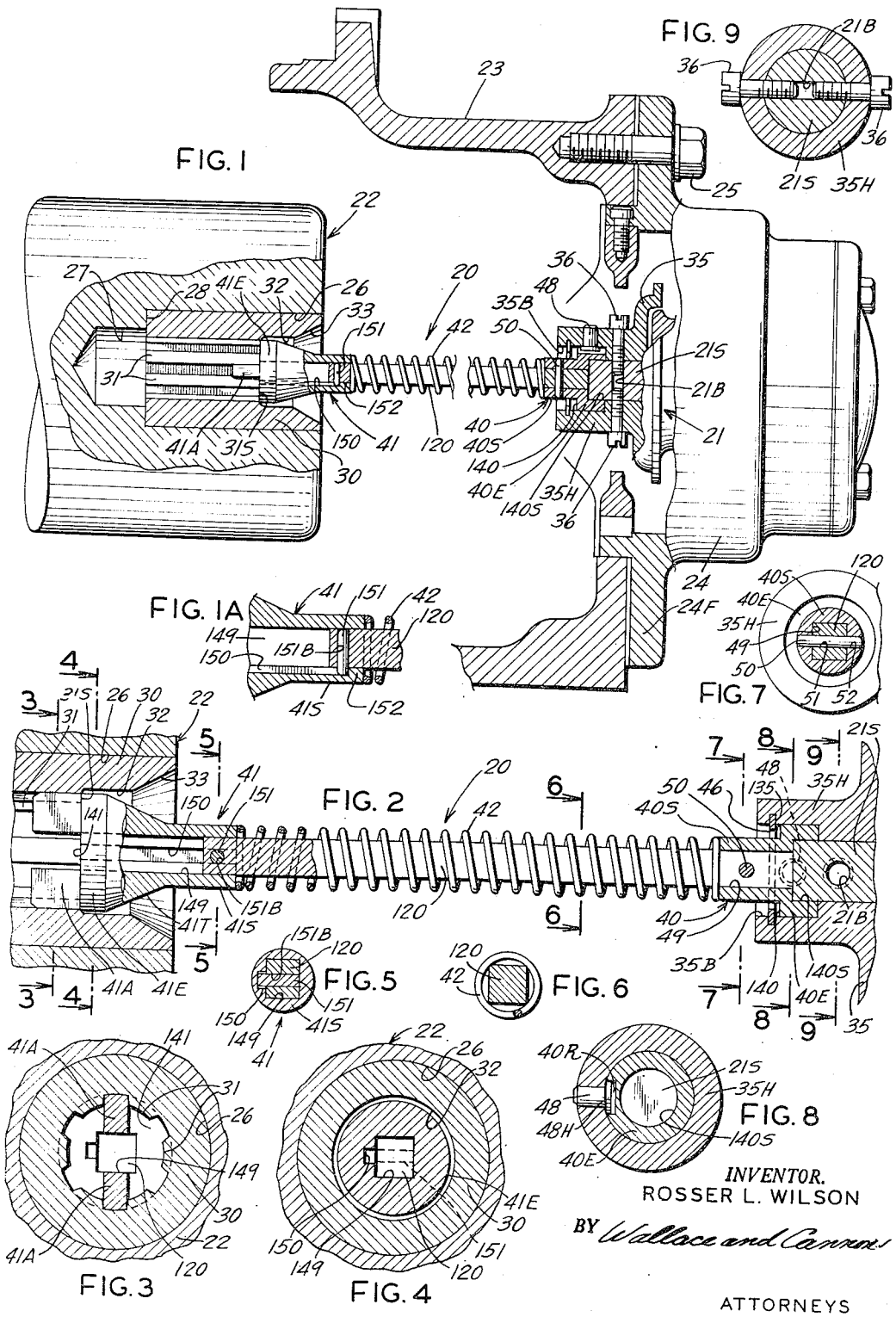

2,778,209

DRIVE SHAFT ASSEMBLIES

Rosser L. Wilson, Mahwah, N. J., assignor to American Brake Shoe Company, Wilmington, Del., a corporation of Delaware Application March 29, 1954, Serial No. 419,356

1 Claim. (Cl. 64—1)

This invention relates to flexible drive shafts, and particularly such shafts adapted to be disposed in a rotative driving relationship between the end of a railway journal and a rotative element such as a commutator switch or a generator mounted on the outer end of the journal box.

In modern railway equipment it is quite common to utilize axle-driven or journal-driven generators or switch mechanisms in connection with speed measuring or brake controlling operations, and these rotary electrical mechanisms are driven through the use of a flexible connection that is extended from the drive shaft of the electrical mechanism to the adjacent end of the journal within the journal box. To enable such a connection to be made, it is customary to have a drive-receiving socket formed axially in the end of each journal, and such a socket ordinarily takes the form of an internally splined sleeve.

In practice, it has been found that these internally splined sleeves vary considerably in axial length, although established standards of spacing, width and depth of the splines have been maintained quite uniformly. Due to the short length that is sometimes embodied in such splined sockets in the journal, it has been found that it is sometimes difficult to maintain the driving connection between the flexible driving member and the drive socket, it being kept in mind that in railway equipment there is sometimes a considerable amount of endwise or lateral shifting movement of the journals as the journal bearings, or the shoulders on the journal, wear.

When a combination of journal wear and bearing wear allows such excessive axial displacement of the journal, it has been found that the adjacent end of the flexible drive shaft may in some instances become disengaged with respect to the driving socket, and this results in loss of the driving connection and such driving connection cannot be restored without removal of the rotative element of the journal box. When the driving connection is thus disrupted, the mechanism that is controlled by the electrical apparatus that is being driven by the journal loses its controlling or indicating function, and in the case of control apparatus, will produce improper or false controlling operations, and this of course is undesirable. Moreover, the flexible driving shaft, having been disconnected from the driving socket of the journal, may be broken off and dropped into the journal box so that there is a possibility that it may result in bearing wear or breakage.

In view of the foregoing, it is the primary object of the present invention to afford an improved connecting drive shaft assembly for use as a driving connection between the end of the journal and apparatus such as a switch or a generator that is carried on the journal box, and objects related to the foregoing are to afford such a driving connection in which the drive will be maintained at all times, in which such driving connection is largely independent of the axial length or internal surface condition of the splined socket of the journal, and in which re-engagement of the drive may take place automatically after disengagement.

More specifically, it is an object of the present invention to afford such a flexible drive shaft mechanism that is simple in character and which may be manufactured in an economical manner.

Other and further objects of the present invention will be apparent from the following description and claim and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention.

In the drawings:

Fig. 1 is a fragmental vertical sectional view through a journal box equipped with a rotary switch mechanism and having the journal and such switch mechanism operatively connected through the use of a shaft assembly embodying the present invention;

Fig. 1A is an enlarged fragmental portion of Fig. 1;

Fig. 2 is an enlarged portion of Fig. 1;

Figs. 3, 4, 5, 6, 7, 8 and 9 are transverse sectional views taken on correspondingly numbered section lines indicated in Fig. 2 of the drawings.

For purposes of disclosure the invention is herein illustrated as embodied in a flexible drive shaft assembly 20 that is arranged to drivingly connect a rotary switch mechanism 21 with a standard railway journal 22. As shown in Fig. 1 of the drawings, the journal 22 is disposed within a journal box 23 of usual construction, and the rotary switch 21 is carried or mounted within a housing 24, the main flange 24F of which is secured as by means of bolts 25 to the bordering portions of the open outer face of the journal box 23.

The journal 22 is formed in accordance with usual practice to afford an axial bore 26 that has a reduced inner end portion 27 so as to define a locating shoulder 28 at the inner end of the bore 26. Within this bore 26, a hardened drive sleeve 30 is positioned in a non-rotative relationship that may be attained by means of a shrink fit. The internal surface of the sleeve 30 is formed with internal splines 31, and near its outer end, the sleeve is sometimes counter bored at 32 for a short distance so that shoulders 31S are formed at the ends of the splines 31, these shoulders 31S facing outwardly or in a right-hand direction as viewed in Fig. 1 of the drawings. Outwardly beyond the bore 32, the sleeve is formed with what may be termed a counter-sunk or tapered surface 33 to receive a lathe center when the wheels are to be machined by turning.

The rotary switch 21 has a drive shaft 21S that extends to the left as viewed in Fig. 1 of the drawings, and in the present instance, this shaft 21S serves as a mounting for an oil flinger 35 that has a hub 35H surrounding the shaft 21S and projecting for a substantial distance beyond the end of the shaft. This flinger 35 is drivingly inter-connected with the shaft 21S by a pair of screws 36 that are extended radially through the hub 35H and into a transverse bore 21B that is formed in the shaft 21S. Thus the flinger 35 is driven with the shaft 21S and the projecting portions of the hub 35H afford a socket 35B into which the adjacent end of the flexible drive shaft assembly 20 may be extended.

The flexible drive shaft assembly 20 as constructed under the present invention comprises an elongated shaft 120 that is square in cross section, as will be evident in Figs. 5, 6 and 7, and at opposite ends of the shaft 120, coupling heads 40 and 41 are associated with the shaft 120, one of these heads being arranged for limited lost motion axially of and with respect to the shaft 120, and an expansive coil spring 42 being disposed in a surrounding relationship about the shaft 120 so as to normally urge the two heads 40 and 41 to the most remote relationship that is permitted by stop means that form a part of the aforesaid lost motion connection.

In the present instance, the head 40 is connected to the shaft 120 in what may be termed a permanent relationship in that the shaft cannot be displaced axially with respect to the head 40, and the aforesaid lost motion connection is afforded between the shaft 120 and the head 41. Thus with respect to the head 40, it will be noted that this head comprises a sleeve-like member 40S that has an enlarged portion 40E at its right-hand end as viewed in Fig. 2. The enlarged portion 40E has an internal socket 40S formed therein that is adapted to surround the end of the shaft 21S, while at the same time fitting relatively loosely within the internal bore 35B of the hub 35H of the flinger so as to afford a universal drive connection. At the juncture of the sleeve portion 40S and the enlarged portion 40E, the head 40 has an abutment shoulder 140 that faces to the left as viewed in Fig. 2, and this abutment shoulder is utilized in holding the head 40 in position within the hub 35H. Thus the hub 35H has an internal annular groove 135 formed therein within the socket 35B, and an annular snap ring 46 is located in this groove 135 in position to engage the shoulder 140 and thus prevent endwise withdrawal of the head 40.

In the present instance the rotative connection between the head 40 and the shaft 21S is established through the intermediary of the hub 35H, and to this end, it will be noted that the enlarged portion 40E has an internal spline or longitudinal recess 40R formed therein as shown particularly in Figs. 1 and 8 of the drawings. This spline or recess 40R is arranged to receive the head 48H of a radially located drive pin 48 that is disposed in the hub 35H as will be evident in Figs. 1 and 8 of the drawings.

The shaft 120 is, of course, drivingly connected to the head 40, and this is accomplished by forming the sleeve 40S of this head with an internal longitudinally extending opening 49 as shown in Fig. 7 of the drawings. This opening 49 is complemental to the cross sectional form of the square shaft 120, and the shaft 120 is held in place by a transverse drive pin 50 that is extended with a firm drive fit through transverse bores 51 and 52 that are formed respectively in the shaft 120 and the sleeve 40S. This arrangement is shown in Figs. 1, 2 and 7. Thus the shaft 120 and the head 40 are held against axial displacement with respect to each other by the pin 50, while the retaining ring 46 holds the head 40 in position within the socket 35B of the flinger 35. Moreover, with the head 40 held in this position, it is drivingly connected to the flinger, and of course to the shaft 21S through the driving pin 48 and the driving spline 40R.

The head 41 is relatively long, as will be evident in Figs. 1 and 2, and this length is required because it is within and with respect to the head 41 that the required endwise lost motion is to be attained. Thus, as shown in Fig. 2, the head 41 comprises a relatively small diameter sleeve-like portion 41S and an enlarged portion 41E at the other or left-hand end as viewed in Fig. 2, and the portions of different diameter are connected by a tapered outer wall portion 41T. On its left-hand end, as viewed in Fig. 2, the enlarged portion 41E has a pair of spaced but diametrically related axially extending fork members or arms 41A that are shown in Figs. 1, 2 and 3, and these arm members 41A are so formed and related that they may be inserted axially into the spline grooves between the splines 31, as will be evident particularly in Figs. 1 and 3. Such engagement is attained by an endwise inserting movement, and when this is done, the end surface 141 of the enlarged portion 41E engages the ends or shoulders 31S of the splines 31, thus to limit the endwise inward movement of the head 41 with respect to the journal socket. The head 41 is, of course, urged yieldingly toward the position shown in Figs. 1 and 2 at all times, and yet when there is an endwise movement of the journal 22 with respect to the journal box, this movement may take place by reason of the lost motion connection that is afforded between the shaft 120 and the head 41.

In attaining the aforesaid lost motion connection, the portions 41S and 41E of the head 41 have an axial passage 149 formed therein that is of square cross section so as to be complemental to the square cross section of the shaft 120, and along one side of the axial passage 149, an elongated spline groove 150 is formed. This spline groove 150 is adapted for cooperation with a transverse stop pin 151 so that this stop pin 151 may serve as a means for limiting the endwise withdrawing movement of the shaft 120 in a right-hand direction, Fig. 1, with respect to the head 41. The pin 151 extends through a transverse bore 151B in the shaft 120, and has a firm drive fit therein so as to be held in the desired endwise position in such bore. In other words, the spline groove 150 does not have a rotative driving function in the present instance, such rotative driving function being afforded by the cooperation of the non-circular or square cross section of the shaft 120 and the complemental passage 149. The endwise limiting movement that is thus exerted by the pin 151 is caused by abutment of the projecting end of the pin with a flange 152 which, as shown in Figs. 1 and 1A, closes the end of the spline groove 150 that is closest to the other head 40.

The structure that has thus been described is of particular advantage from an operational sense, as will be set forth in further detail hereinafter, but it also has considerable advantage insofar as simplicity and cost of manufacture may be concerned. Thus the heads 40 and 41 may readily be formed by precision casting methods so as to eliminate all machining operations with respect thereto, even to the extent in some instances of forming the transverse bores 52 therein. Also, with respect to the head 41, the form is such that the head may be formed by a precision casting operation so that no machining is required. Then, with these head castings, all that is necessary to produce the drive shaft assembly is to cut the square shaft 120 to the desired length and form the transverse bores therein to receive the pins 50 and 151.

In the use of the assembly 20 of the present invention, the transverse pin 151 serves primarily to hold the head 41 in position on the shaft 120 prior to mounting of the shaft assembly in its position of use, and the length of the shaft 120 is chosen so that the pin 151 will normally be located substantially midway between the ends of the passage 149 in which the shaft 120 slides. In Fig. 1 of the drawings, the pin 151 is shown as being displaced slightly to the left of the stop shoulder 152, but in Figs. 1A and 2, the relationship of the parts as illustrated is such that the stop pin 151 is in engagement with the stop shoulder 152.

Under normal conditions of use, the lateral or endwise motion of the journal 22 results in what may be termed approaching movements or separating movements of the journal with respect to the end of the driven shaft 21S, and such approaching and separating lateral movements will be considered separately. Thus in a separating lateral movement, the head 41 may move to the left as viewed in Figs. 1 and 2 to the extent that is determined by the engagement of the pin 151 with the shoulder 152, and if the lateral separating movement is excessive, the head 41 may thereafter be withdrawn slightly from the socket 32, but it will be observed that in any such withdrawing movement, the substantial length of the forks or arms 41A provides for maintaining the rotative drive connection throughout a substantial additional range of separating lateral movement.

Upon return lateral movement in an approaching direction, the head 41 will again be seated in the socket 32 as shown in Figs. 1 and 2, and thereafter, the shaft head 41 will move endwise to the right, Fig. 1, with respect to the shaft 120. This approaching movement may continue to such a point that the spring 42 is fully compressed and the compressed length of the spring 42 is the only limit that is provided, except, of course, the limit that is provided by the depth of the counterbore 27 in the axle. In this connection, it is to be observed that the driving connection between the head 41 and the shaft 120 is maintained throughout this entire range because of the cooperating, non-circular cross section of the shaft 120 and the passage 149, and while the stop pin 151 moves out of its groove 150 during such excessive lateral approaching movement of the journal, this stop 151 will re-enter the groove 150 when the journal 22 again returns in a separating or left-hand direction to its normal centered relation.

From the foregoing description, it will be apparent that the present invention affords an improved connecting drive shaft assembly for use in journal boxes to effect a connection between the journal and rotative apparatus mounted on the journal box, and it will also be evident that the driving shaft assembly of the present invention will operate over a wide range of lateral or axial shifting movement of the journal. Moreover, the drive shaft assembly of the present invention is simple in character and may be manufactured in a simple and economical manner.

I claim:

In a railway journal box assembly comprising a journal box, a journal extending into said journal box and having a splined drive socket in the end thereof facing the inside of said journal box, and a rotary mechanism supported on said journal box in spaced relationship with respect to said journal, a flexible coupling shaft assembly comprising: a first connecting head, having a non-circular opening extending therethrough, mechanically coupled to said rotary mechanism; an elongated straight shaft, having a non-circular cross-sectional configuration complemental to the cross-sectional configuration of said connecting head opening, inserted axially into said connecting head opening; means interconnecting said shaft and said first connecting head for preventing axial movement of said shaft with respect to said head; a second connecting head, having a non-circular opening extending therethrough complemental in cross-sectional configuration to said shaft mounted on said shaft in axially movable engagement therewith and extending into said journal drive socket; at least two fork members affixed to and extending from said second connecting head into sliding engagement with the splines of said drive socket to lock said second connecting head to said journal while permitting axial movement of said second connecting head with respect to said journal; and an expansive coil spring encompassing said shaft in engagement with said two connecting heads to urge said two heads away from each other.

References Cited in the file of this patent

UNITED STATES PATENTS

| | | |
|---|---|---|
| 1,631,236 | Werner | June 7, 1927 |
| 2,422,946 | Brittain | June 24, 1947 |
| 2,567,127 | Shoffner | Sept. 4, 1951 |